US005609661A

United States Patent [19]
Moreau et al.

[11] Patent Number: 5,609,661
[45] Date of Patent: Mar. 11, 1997

[54] CHANNEL FOR THE TRANSFER AND CONDITIONING OF MOLTEN GLASS

[75] Inventors: Raymond Moreau, Croissy sur Seine; Roger Gobert, Feucherolles; Pierre Jeanvoine, Poissy, all of France

[73] Assignee: Saint-Gobain Vitrage, Courbevoie, France

[21] Appl. No.: 333,304

[22] Filed: Nov. 1, 1994

[30] Foreign Application Priority Data

Nov. 2, 1993 [FR] France .................... 93 13022

[51] Int. Cl.$^6$ .................... C03B 5/18; C03B 5/225
[52] U.S. Cl. .................... 65/135.1; 65/134.1; 65/135.7; 65/135.8; 65/157; 65/335; 65/339; 65/345; 65/346; 65/347
[58] Field of Search .................... 65/134.1, 135.7, 65/135.8, 135.1, 157, 335, 339, 345, 346, 347

[56] References Cited

U.S. PATENT DOCUMENTS

| 3,294,512 | 12/1966 | Penberthy | 65/178 |
|---|---|---|---|
| 3,332,763 | 7/1967 | Basler et al. | 65/157 X |
| 3,486,876 | 12/1969 | Augustin et al. | 65/374.13 X |
| 3,723,084 | 3/1973 | Colchagoff | 65/136 |
| 3,734,701 | 5/1973 | Pecoraro et al. | 65/134.1 X |
| 3,771,986 | 11/1973 | Stultz et al. | 65/134.1 |
| 3,771,988 | 11/1973 | Starr | 65/134.1 X |
| 3,915,682 | 10/1975 | Chotin et al. | 65/29 |
| 3,937,624 | 2/1976 | Heitzer et al. | 65/135.1 |
| 3,999,972 | 12/1976 | Brax | 65/346 X |
| 4,001,001 | 1/1977 | Knavish et al. | 65/136 X |
| 4,012,218 | 3/1977 | Sorg et al. | 65/347 X |
| 4,029,489 | 6/1977 | Froberg et al. | 65/136 |
| 4,046,546 | 9/1977 | Hynd | 65/135.1 X |
| 4,278,460 | 7/1981 | Chrisman et al. | 65/135.1 |
| 4,365,987 | 12/1982 | Boettner | 65/134.1 X |
| 4,432,780 | 2/1984 | Propster et al. | 65/134 X |
| 4,544,394 | 10/1985 | Hnat | 65/134.1 |
| 4,693,740 | 9/1987 | Noiret et al. | 65/135.1 |
| 4,789,900 | 12/1988 | Pieper | 65/135.8 X |
| 4,816,056 | 3/1989 | Tsai et al. | 65/135.1 X |
| 4,929,266 | 5/1990 | Cozac et al. | 65/135.1 X |
| 4,990,337 | 2/1990 | Zortea et al. | 65/135.1 |
| 5,002,600 | 3/1991 | Sorg et al. | 65/346 |
| 5,055,123 | 10/1991 | Meacle | 65/135.1 |
| 5,194,081 | 3/1993 | Trevelyan et al. | 65/135.1 X |
| 5,370,723 | 12/1994 | Trevelyan et al. | 65/346 |
| 5,417,732 | 5/1995 | Shamp et al. | 65/135.1 X |

FOREIGN PATENT DOCUMENTS

| 0304371 | 2/1989 | European Pat. Off. . |
|---|---|---|
| 0512900 | 11/1992 | European Pat. Off. . |
| 2195598 | 3/1974 | France . |
| 2195597 | 3/1974 | France . |
| 2220480 | 10/1974 | France . |
| 3119816 | 1/1983 | Germany . |

*Primary Examiner*—Steven Weinstein
*Assistant Examiner*—Milton I. Cano
*Attorney, Agent, or Firm*—Oblon, Spivak, McClelland, Maier & Neustadt, P.C.

[57] ABSTRACT

A channel (1) for the outflow/conditioning of molten glass includes a duct and superstructure (5) and is designed to transfer the molten glass from a vitrifiable material melting and refining zone (6) to a molten glass forming zone, in order to take it from its melting temperature to its forming temperature. It consists of a multiplicity of successive zones (8, 9, 10, 11, 12, 13, 14) located substantially transversely in relation to its longitudinal axis, each zone having its own function, being heat-controlled in an autonomous manner and insulated over part of its height relative to the adjacent zones by partitions (15). The zones include at least one transition zone (8), at least one drainage zone (9), at least cooling zone (10, 11, 12) and at least one thermal and/or chemical homogenization zone (13, 14).

30 Claims, 3 Drawing Sheets

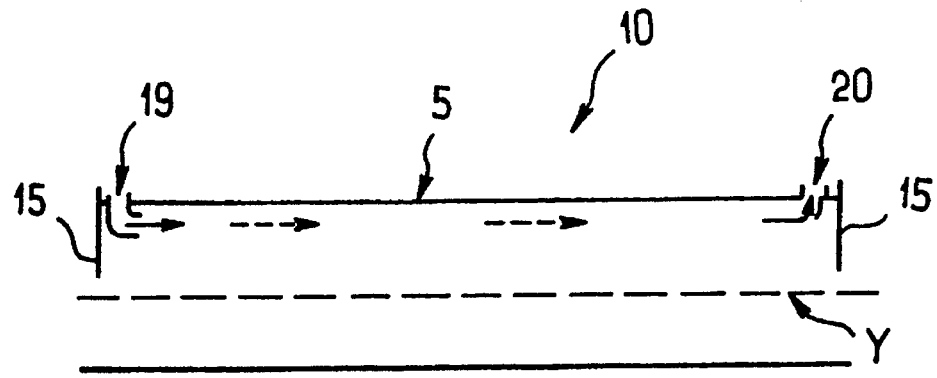
FIG_3
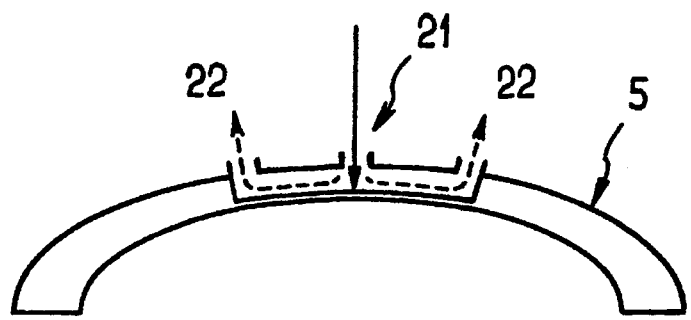
FIG_4
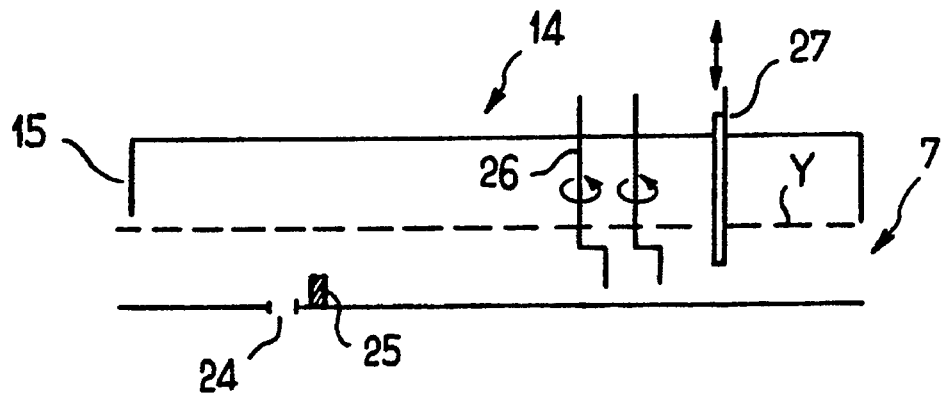
FIG_5

CHANNEL FOR THE TRANSFER AND CONDITIONING OF MOLTEN GLASS

BACKGROUND OF THE INVENTION

1. Field of the Invention

The invention concerns an outflow channel for the transfer and conditioning of molten glass from a glass melting and refining zone supplied with vitrifiable materials to a flat-glass forming zone. Such a channel is more particularly incorporated into the structure of devices commonly known as melting furnaces which are designed for the continuous supply of molten glass to flat-glass forming installations based on the float-glass process.

2. Background of the Related Art

In order to melt the vitrifiable materials and condition the molten glass so that it displays the requisite quality, and particularly good chemical and thermal homogeneity, such furnaces are provided with successive compartments discharging to one another, each having well defined functions.

There is know from EP-8-0 304 371 a furnace comprising a first compartment in which is effected the melting of the vitrifiable materials, which compartment is followed by another forming a neck, known as a corset and discharging to a compartment known as a conditioning compartment, where the glass is conditioned. This compartment then delivers the homogenized glass to an outflow channel, the function of which is limited to transferring the glass to the forming installation.

Such type of furnace, while making it possible to supply a glass of high quality, is not devoid of certain disadvantages. For example, its structure is not of very simple design since it involves no less than four separate compartments of very different dimensions. Moreover, the so-called conditioning compartment where conditioning of the glass takes place is designed in such a way as to be able to generate at will a belt of convective recirculation of the glass in the melting compartment, that is, a so-called "return" current. While this recirculation current is useful optimizing the conditioning of the glass by increasing its dwell time in the furnace, it requires considerable heating of the melting compartment where the glass recirculates continuously at the lower temperature obtained from the conditioning compartment.

There is furthermore known from patent U.S. Pat. No. 3,294,512 a furnace, the melting compartment of which discharges to a compartment which ensures both transfer and conditioning of the glass, and the dimensions of which define a sufficiently restricted depth of glass to prevent the formation of a convective current of glass. However, the conditioning of the glass in this manner may not be sufficient. This furnace is nevertheless designed in such a way as to promote the generation of convective currents within the glass but in the melting compartment in the vicinity of the junction with the conditioning compartment.

SUMMARY OF THE INVENTION

An object of the invention is to overcome these disadvantages by providing a new method of conditioning of molten glass which will ensure the supply of a high-quality glass but without being penalizing in terms of the cost of construction and/or cost of operation of the furnace in which such conditioning is performed.

Another object of the invention is a channel for the outflow and conditioning of molten glass.

The above and other objects are carried out according to the invention by a channel for the outflow and conditioning of molten glass, comprising a duct and superstructure and designed to transfer the glass from a melting/processing zone supplied with vitrifiable materials to a forming zone, in order to take the glass from its melting temperature to its forming temperature. The channel consists of a multiplicity of successive zones located substantially transversely in relation to its longitudinal axis, each zone having its own function, being heat-controlled in an autonomous manner and insulated from the adjacent zones over part of its height by means of separation. Such means may in particular take the form of heat shields suspended from the vault, shading walls, surbased arches or even suspended dams partly submerged in the molten glass.

This succession of zones comprises advantageously at least one transition zone and at least one drainage zone designed to remove from the glass any impurities consisting of glass contaminated by the presence of unmelted material or inclusions originating from refractory material.

Provision should also be made for at least one cooling zone designed to reduce the overall temperature of the glass arriving from the melting zone, this being done in order to impart the appropriate temperature to the glass prior to its delivery to the forming installation.

The channel in question likewise comprises at least one thermal and/or chemical homogenization zone designed to reduce the occurrence of temperature gradients in the glass and/or the presence of different "veins" of glass which are chemically slightly different from one another.

The so-called transition zone may be located between the remainder of the channel and the "upstream" compartment which discharges to the latter, such "upstream" compartment being constituted in particular by the melting and refining compartment. This transition zone can thus make it possible, because of its structural features, to optimize the rate of flow of the glass from such upstream compartment arriving in the channel.

In fact, the design of a furnace provided with such a channel is, generally speaking, comparatively simple, since the melting compartment may be made to discharge directly into this channel, which provides for both the transfer and conditioning of the glass.

Segmenting this channel into different zones makes it possible to rationalize the conditioning process. Conditioning is broken down into several complementary operations, such as cooling, thermal equalization, chemical homogenization, drainage or optimization of the glass flow rate, each of the channel zones being specifically assigned to one of such operations.

Each of these operations may thus be controlled and adjusted in the best possible way, independently of the others, thus rendering the conditioning of the glass very adaptable and flexible according to requirements; such adaptability is reinforced by the fact that the zones are each provided with independent heat control and are partly "sealed" in relation to the others, at least insofar as concerns the atmosphere defined in each of the zones between the level of the glass and the vault.

Advantageously, the dimensions of the channel are selected in such a way as to avoid the formation of a belt of convective recirculation of glass in the melting zone, in particular by restricting the depth of glass in the channel.

The absence of this recirculation belt makes it possible to anticipate a substantial reduction in the cost of energy to operate the furnace, because it effectively overcomes the problem of entry of "colder" glass into the melting compartment from the conditioning compartment which necessitates a considerable heat input at the melting compartment, accompanied by significant heat insulation arrangements. It should also be noted that the inertia of the furnace is thereby considerably reduced and that it is possible to change from the manufacture of one type of glass to another, for example from a clear glass to a considerably darker glass.

However, the economic advantages associated with the absence of such a recirculation belt are not obtained to the detriment of the quality of conditioning of the glass, thanks to the segmentation of the channel into specific function zones, which segmentation makes it possible to monitor the conditions and act very quickly on each of these zones in order to adjust them in the best possible way.

Structurally speaking, the channel according to the invention preferably comprises a bottom wall which is substantially flat and therefore does not have a threshold between the various constituent zones. It also preferably comprises at least one, and in particular only one, modification of section, which modification may be located at the junction between the most "upstream" zone of the channel and the succeeding zone. This modification, in particular a reduction of section, is particularly desirable in order to optimize the rate of flow of the glass entering into the channel. However, the channel according to the invention remains generally of simple design.

The terms "upstream" or "downstream" used throughout this description refer to the direction of flow of the glass through the channel.

The channel according to the invention comprises advantageously a "most upstream" zone, hereinafter called the "fore-channel" the main function of which is to control the flow rate of the glass entering into the channel. To do this, and as stated earlier, it has a section larger than that of the succeeding zones. Its section may thus be of a size intermediate between that of the most downstream zones of the channel and that of the melting compartments located immediately upstream. In fact, it acts rather as a regulating "buffer" zone to avoid excessively rapid suction of the molten glass flowing from the melting compartment into the channel, this being done in order to avoid any disturbance to the system of flow of the glass in the compartment located upstream of the channel, in particular the melting and refining compartment.

The fore-channel may furthermore be provided with first means of drainage, in particular surface drainage, located in the fore-channel and designed in such a way as to affect most particularly the lateral veins of the flow of glass. Such means may consist of skimming pockets associated with surface drains and placed advantageously at the ends of two outflow branches located on either side of the fore-channel, which branches may likewise serve where necessary as spillways (also called spouts). If the channel is specifically designed for the overall lowering of the temperature of the glass in order to render it suitable for forming, for example by about 150°, then such cooling should be progressive and the temperature of the glass will therefore be carefully controlled throughout the channel.

Moreover, the temperature of the glass determines at least in part the extent and nature of the convection currents which impel it.

Thus, the fore-channel which, as has already been stated, is a zone of transition between the melting compartment and the reminder of the channel, is advantageously provided with auxiliary means of reheating, Such means are in particular comprised of burners arranged in two symmetrical rows relative to the longitudinal axis of the channel, the heating power of such burners being capable of adjustment according to requirements.

The channel also comprises at least one drainage zone to supplement the drainage effected in the fore-channel. Such zone preferably follows after the fore-channel and is provided with means of drainage which may be advantageously designed so as to affect more particularly the central vein of the flow of glass, thereby effectively completing the drainage of the lateral veins performed earlier in the fore-channel. The means of drainage comprise a surface drain advantageously associated with a slow-turning entrainment device submerged in the glass and with a deflection dam capable of being submerged at least partly in the glass. In fact, the optimum configuration to achieve efficient drainage consists in placing the dam preferably at an angle other than 90° to the longitudinal axis of the channel downstream of the drain and of the entrainment device, the direction and speed of rotation of which are suitably selected. The entrainment device thus tends to cause a rotary flow which gathers the contaminated surface glass in one of the corners formed by the barrier with the sidewalls of the channel, where it may be easily disposed of via the surface drain.

The channel also comprises at least one zone specifically intended for cooling the glass, and preferably three of such zones in succession. Their role, as previously stated, is to lower the temperature of the glass by eliminating or at least reducing any existing temperature gradients, particularly according to an axis perpendicular to the axis of flow of the glass.

Glass naturally tends to have a lower temperature at its edges, that is, in the vicinity of the sidewalls of the channel. The best procedure is therefore to concentrate cooling on the middle part of the flow of glass and to cool in a much more moderate manner, or even to reheat, its lateral parts.

To cool the glass in its middle part, each of the cooling zones may use one of more of the following means of cooling, each of which provides specific advantages:

Ventilating the cooling zone by feeding via the vault into the channel a gas such as air at a preset temperature. The gas is then preferably made to flow along a path substantially parallel to the longitudinal axis of the channel in order to act in particular on the middle part of the glass. However, it is preferable to avoid excessively direct or abrupt contact between the cooling gas and the glass, and the gas should therefore be made to flow as much as possible at a certain distance from the level of the glass. There may therefore be used, suitably adopted as necessary, the means of longitudinal ventilation described in patent FR-2 220 480.

Provision may also be made for another means of cooling, without resorting to ventilation, which can lead to the introduction of disturbing gases into the atmosphere of the channel. Thus, the vault may be cooled from the outside, for example by causing to flow a cooling fluid, either gaseous or liquid, within its actual thickness. The circuit for the flow of fluid in the vault is designed, for example with a multiplicity of injection points located in the outer wall of the vault and situated preferably on its median axis, each of such injection points is linked by ducts to drain-holes likewise provided in the outer wall of the vault.

By thus causing the cooling fluid to flow within the thickness of at least one wall of the channel, especially the vault, in a honeycomb structure located within its thickness, it is possible to cool the glass not by convection but rather by radiation to the colder vault.

The flow of the fluid in question within the thickness of the wall may be carried out, for example, either along in axis substantially parallel to the longitudinal axis of the channel or along an axis substantially perpendicular to the letter, but essentially affecting the central vein of the glass and not its edges.

Each of the methods of cooling—ventilation or outer wall cooling—has its advantages. Ventilation allows rapid and effective cooling of the glass but can be rather abrupt. On the other hand, cooling of the walls from the outside is much more gradual and ensures full control of the content of the atmosphere overlying the molten glass in the channel (which can prove very useful during the manufacture of special types of glass). However, such outer wall cooling brings about a certain inertia, which is not always advantageous where the manufacturing conditions need to be altered fairly frequently over a period of time.

The best solution is therefore to combine both methods of cooling. Greater flexibility is thus achieved by being able to implement them to a greater or lesser extent, either alternately or simultaneously. Each cooling zone way be equipped with a given method of cooling or with both methods of cooling at one and the same time. All combinations are possible.

Additionally, at least one of the cooling zones is advantageously provided with means of lateral reheating, located either at the channel sidewalls or on the edges of the vault. Such means may take the form of standard burners of the so-called "edge" type, which are usually capable of reheating widths of glass of the order of one centimeter up to about ten centimeters. They may also consist of so-called flat-flame burners designed in such a way as to emit flames which travel along the walls where they are located rather than impinging directly on the surface of the flowing glass. The burners thus indirectly reheat the glass over a much more significant width, for example several tens of centimeters on either side.

It may also be decided to use radiant tubes, discharging for example from openings made in the sidewalls and capable of being inserted to a greater or lesser depth in the channel so as to set the width of glass exposed to heat. There may likewise be used electrical heating means, for example electrodes submerged in the edges of the flow of glass, or any other means.

The common feature of the various devices is that they are either completely devoid of flames or generate flames which, however, do not impinge directly on the glass.

Whether it is a question of cooling or reheating the glass locally, it is therefore preferable that this modification of temperature takes place in a gradual manner, essentially by radiation from the walls. The cooling zone or zones are advantageously followed by a temperature equalization zone intended to eliminate any temperature gradients which have subsisted or are generated by cooling action in the preceding zones. It is in this zone that judicious use is made of cooling and/or reheating means such as those previously described. It is possible, for example, to combine the use of ventilation by more or less preheated air with the possible use of lateral means of heating if this proves necessary. It should be noted that, if it is decided to use in the channel as a whole both a non-ventilation method of cooling and a flameless method of reheating of the radiant tube type, it will then be possible to exert full control over the atmosphere of the channel, for example by providing a nitrogen atmosphere, which is advantageous in order to be able to manufacture so-called "special" types of glass.

In the most downstream part of the channel, provision is preferably made for a final zone of drainage—in particular for the lower vein of glass in contact with the bottom wall, and homogenization in order to ensure final purification of the glass before it flows out of the channel via a pouring lip which is of smaller section. This zone is therefore equipped with a bottom drain such as a slot provided in the bottom wall. To ensure more efficient drainage, the drain is advantageously located immediately upstream of a heel located on the bottom wall, which makes it easier to collect the impurities. Downstream of this bottom drain are advantageously located a multiplicity of agitators designed to improve the homogeneity of the glass.

This homogenization zone may likewise comprise, downstream of the bottom drain and of the agitators, a means for regulating the loss of head induced by the flow of glass. This consists, for example, of a dam, the depth of immersion of which in the glass may be adjusted at will.

Generally speaking, therefore, the channel according to the invention may be located in a melting furnace, either directly or otherwise between the melting/refining compartment and the forming zone.

The fore-channel—a zone of transition—may at one and the same time have an intermediate section, as already stated, and be located, like the remainder of the channel, in an elevated position relative to the melting compartment.

The melting compartment itself may be of the flame type.

A means of heating may thus consist of a multiplicity of oxygen burners, without reverse operation or use of regenerators, oxygen combustion providing better thermal efficiency than combustion with conventional burners fuelled by air, thereby reducing the volume of combustion fumes as well as the quantity of pollutant gas to be removed, of the NO type. An advantageous design of a furnace equipped, in its melting compartment, with oxygen burners is described in French patent application No. 93/13021 dated Nov. 2, 1993 (corresponds to the copending, commonly assigned, U.S. patent application Ser. No. 08/332,036 filed Nov. 1, 1994, the features of which are incorporated by reference into the present application.

It is preferable that, if this compartment discharges directly to the channel according to the invention, the burners to be used for the fore-channel be also oxygen burners. Thus, where no means are available to achieve full sealing of the atmosphere of the melting and refining compartment relative to that of the fore-channel, there is eliminated the risk of air entering into the melting and refining compartment from the fore-channel. In particular, where provision is made in the cooling zones of the channel according to the invention for means of cooling by ventilation, it is also important to provide mans for sealing the atmosphere of such zones, and of the channel generally, relative to that of the melting and refining compartment. Such means may take the form of heat shields suspended from the vault and emerging at the level of the glass, or, better still, a suspended dam partly submerged in the glass. The deflection barrier previously described to facilitate drainage of the central vein of the glass in the drainage zone adjoining the fore-channel may very advantageously perform this role. A different method of beating for the melting and refining compartment way likewise be envisaged, in particular by providing a suitable intermediate compartment between the melting and refining compartment and the channel according to the invention.

The use of the channel, and of the furnace of which it is part, is particularly suitable for the supply of molten glass to a flat-glass forming installation based in the float-glass process.

BRIEF DESCRIPTION OF THE DRAWINGS

Other features and advantages of the invention will become apparent from the following description of a non-limiting embodiments, with the aid of the following figures in which:

FIG. 3 is a longitudinal section view of a cooling zone of the channel;

FIG. 4 is a cross-sectional view of a cooling zone of the channel; and

FIG. 5 is a plan view of a homogenization zone of the channel.

DETAILED DESCRIPTION OF THE PREFERRED EMBODIMENT

Figure 1:
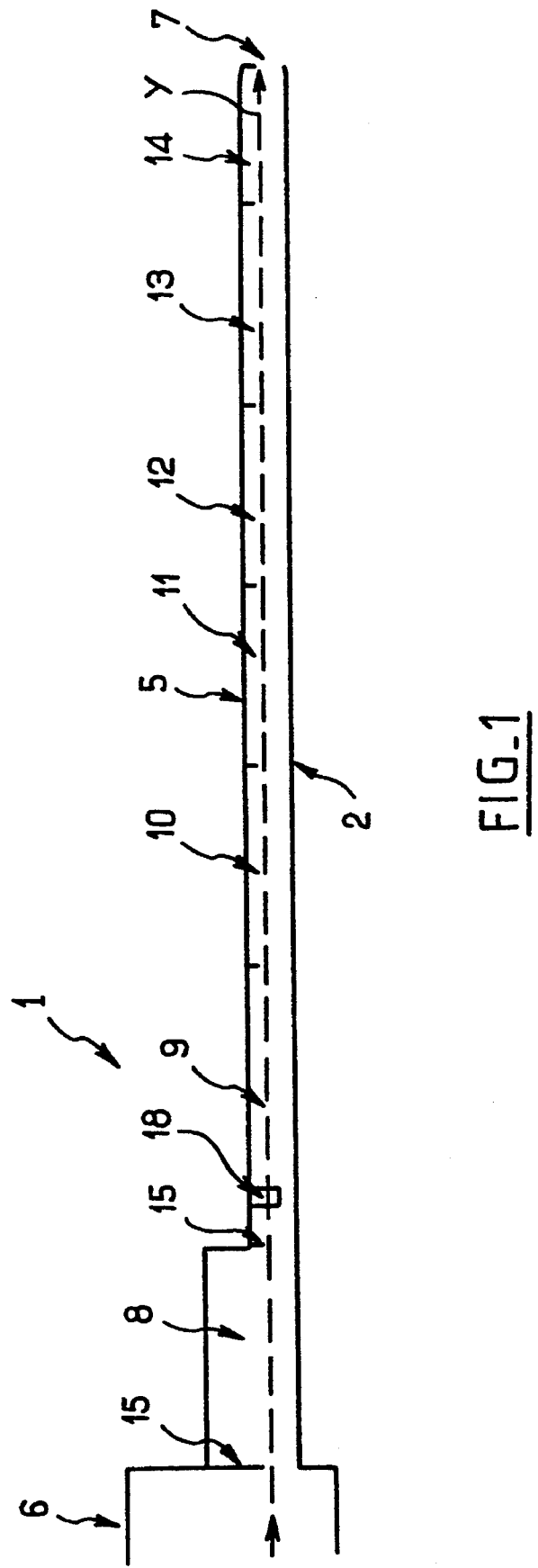
FIG. 1 is a longitudinal section view of the channel.
Figure 2:
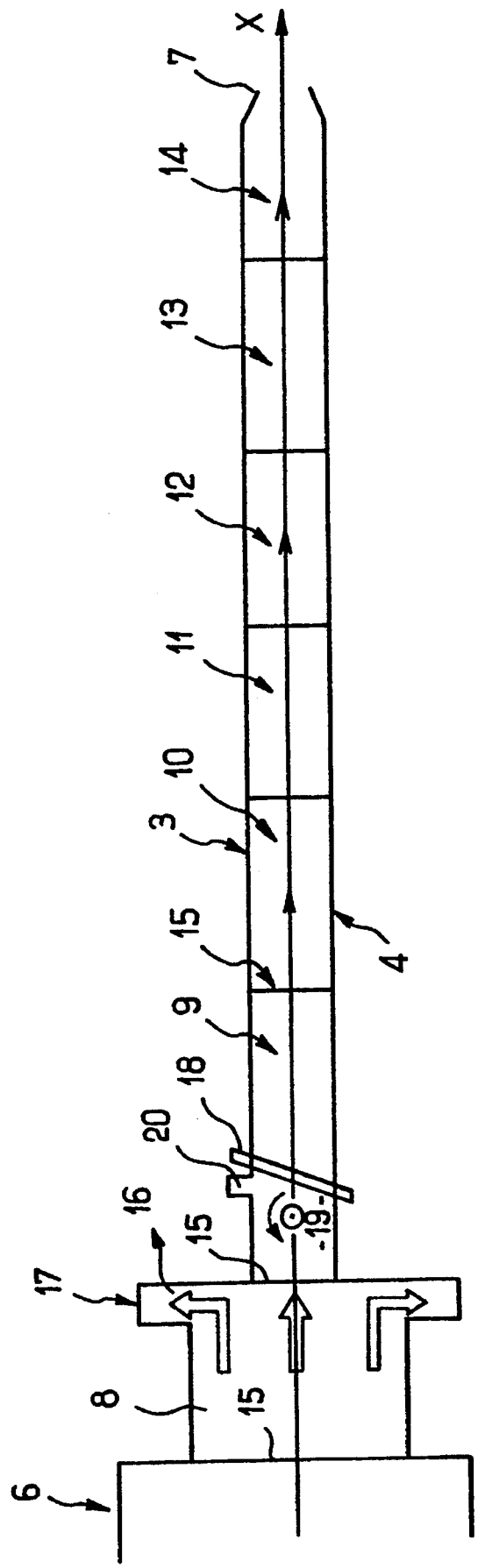
FIG. 2 is a plan view of the channel.

FIGS. 1 and 2 show in a very schematic manner a transfer and conditioning channel 1 according to the invention. This channel comprises a duct delimited by a bottom wall 2, sidewalls 3 and 4, and vault 5. The glass flows therefrom according to the longitudinal axis X of the channel. It originates from a melting compartment 6 of which only the "downstream" end is illustrated, and it discharges from the most downstream zone 14 of the channel by a pouring lip 7 which continuously delivers molten glass to a flat-glass forming device such as that based on the float-glass process (not illustrated).

Bottom wall 2 of channel 1 is approximately flat and horizontal throughout the length of the latter. Sidewalls 3 and 4 are substantially vertical. Vault 5 is flat or curved.

The level of molten glass in channel 1 is indicated by broken line Y. The section of channel 1 is approximately constant throughout its length, except for the most downstream part of zone 8, known as the fore-channel, which has a section, and in particular a width, intermediate between that of melting compartment 6 and that of the remainder of channel 1. Its height from the bottom wall, i.e., the siege, to the top of the vault, i.e., the crown, is likewise intermediate.

The fore-channel 8 constitutes the first zone of channel 1 and, because of its dimensions, is capable of optimizing the rate of flow of the glass entering channel 1. Furthermore, the fore-channel 8 and more generally the whole of channel 1 has a threshold, its bottom wall being in an elevated position relative to that of melting compartment 6. A suitable choice from among all these designs makes it possible to suppress any convective current returning from the glass in channel 1 to melting compartment 6, thus ensuring a significant saving of energy in melting compartment 6 while reducing the inertia of the furnace (i.e., the time required to change from one type of glass to another).

There are now described one by one the various zones 8 to 14 of channel 1, from the upstream end to the downstream end, with reference to the direction of flow of the glass indicated by axis X:

Fore-channel 8 is thermally isolated from melting compartment 6 and from succeeding zone 9 of channel 1 by heat shields 15 suspended from the vault and the lower part of which is close to the level Y of molten glass. All ensuing zones 9 to 14 of the channel are likewise thermally separated from one another by this type of heat shield 15 which acts as a thermal separating means.

The fore-channel 8 is provided with two outflow branches 16, located transversely to axis X, in which are provided suitably shaped skimmer pockets 17 associated with surface drains.

Such surface drainage proves particularly effective in eliminating from the lateral veins of the flow of glass all the unmelted material or contaminated or lightweight glass on the surface. Outflow branches 16 are located in fore-channel 8 immediately upstream of the junction of this fore-channel with the succeeding zone, that is, immediately in front of the sudden reduction of section of the channel. It is therefore mainly the glass which is found "on the edges" and not the central vein, which is mainly to be entrained, pushed toward the outflow branches and drained via skimmer pockets 17, because of the geometry of the channel section in this zone. The extent of the reduction of section in the junction between these two zones will therefore determine the width of glass which is to be subjected on either side of axis X to such surface drainage.

The fore-channel is furthermore equipped with standard burners, for example, fuel-air burners (not shown), located at the sidewalls at a sufficient distance from the level of the glass to avoid direct contact between the flames and the glass. Such burners may also operate with oxygen in cases where heating inside melting compartment 6 is likewise provided by oxygen burners.

Zone 9 is a supplementary drainage zone, equipped with a barrier or dam 18 suspended from vault 5 and partly submerged in the flow of glass. The materials constituting the barrier are chosen in such a way as to be particularly resistant to corrosion, and the method of attachment of the barrier is adapted so that it may be quickly replaced by another if necessary. Barrier 18 it slightly inclined relative to the transverse to the axis of channel 1. Immediately upstream of barrier 18 are located an entrainment device 19, e.g., a cylindrical member rotating slowly about a vertical axis in the illustrated direction, and a surface drain 20.

Any surface impurities which have not been drained via fore-channel 8 by skimmer pockets 17, because of their presence in the central vein of the flow of glass, will thus be trapped in an effective manner. Device 19, because of its slow rotary movement in a specific direction, creates a rotary flow which impels these impurities against barrier 18, so that the impurities build up within the sharp angle formed by barrier 18 with one of the sidewalls of the channel, from which zone they may be easily removed via surface drain 20.

It is therefore highly advantageous to provide in succession several supplementary means of drainage, each acting on a given portion of the flow of glass, to ensure optimum elimination of all the surface impurities.

The three succeeding zones 10, 11 and 12 are so-called cooling zones whose function is to reduce finally the mean temperature of the glass by about 150° to 250° C., in both the most effective and least disturbing manner, so as not to generate further defects or thermal disuniformities.

Such zones are each equipped with at least one of the following means of cooling, as shown in FIGS. 3 and 4, which cooling means are essentially designed to cool the middle part of the flow of glass, that is, the part which has a temperature generally higher than the remainder of the flow of glass.

One such cooling means involves ventilation by injection of gas, for example air at ambient temperature, as shown in FIG. 3. The air is introduced via a duct 190 provided in the vault, which duct is elbowed so that the injected air flows preferably horizontally in the vicinity of vault 5, and according to the direction of flow of the glass, i.e., downstream along the axis X. The air is then exhausted via opening 200 likewise provided in vault 5. The opening 200 is located immediately upstream of a suspended heat shield 15, which thus acts as a barrier to the gas between two adjacent zones. This air stream is thus held where practicable at a distance from the surface of the glass and it cools the glass directly by convection, and by cooling the vault which tends to cool the glass by radiative cooling.

A second cooling means involves external cooling of vault 5 by causing a cooling fluid to flow within its thickness, in this case air at ambient temperature. From FIG. 4 it will be seen that it is possible to inject air into a middle duct 21, which causes the air to flow in internal chambers within the vault before it is exhausted via lateral outlet orifices 22 arranged either at the same transverse level as injection point 21 or downstream from the latter. Provision may also be made for a longitudinal or transverse flow of cooling fluid through a honeycomb structure within the internal chambers of the vault, which structure promotes heat exchange between the fluid and the vault.

As an optimum alternative, the cooling zones are each equipped with both means of ventilation and means of external cooling of the vault. By implementing such means jointly or alternately, it is possible to adjust in the best possible way the intensity of cooling according to the draught, type of glass, etc.

Each cooling zone may also be assigned a given type of cooling.

At least one of the cooling zones is likewise equipped with means for reheating the "edges" of the flow of glass, that is, the glass which is located close to each of sidewalls 3 and 4 of channel 1. Such means are, for example, standard burners of so-called edge type, placed at the level of the sidewalls, or radiant tubes which likewise discharge at that level. They may also be burners of the recalled flat-flame type arranged on the edges of vault 5, which burners are designed in such a way that the flames remain tangential to the vault. Suitable flat-flame burners and radiant tubes are marketed, for example, by Four Industrial Belge F.B.I. and Pyronics.

Such temperature control means may of course be combined. Each of them provides specific advantages. Edge burners are simple and well known but their heating capacity is generally limited. Flat-flame burners can heat a greater width of glass, while radiant tubes are the easiest and simplest to regulate; it is sufficient to adjust their size and, acting from the outside, to immerse them to a greater or lesser depth in the channel above the level of the glass by means of openings provided in sidewalls 3 and 4.

Succeeding zone 13 is a heat equalization or thermal homogenization zone, the purpose of which is to eliminate any residual temperature gradient in the glass, in particular, any residual temperature gradient extending transverse to its axis of flow. Its heat insulation is reinforced, particularly at the level of the vault. It may be equipped with all the previously described means of cooling and/or reheating, either alone or combined, their operation being permanently set as a function of the relevant requirements, which requirements are monitored by measuring instruments, particularly of thermal type, which make it possible to ascertain the temperature of the glass at different points at any time.

This zone is preferably equipped with means of ventilation or cooling using fluids, the temperature of which may be regulated, and means of lateral reheating such as radiant tubes.

Zone 14 is the final homogenization zone. It is equipped with a bottom drain consisting of a transverse slot 24 made in the bottom wall and located immediately upstream of a heel 25 attached to bottom wall 2. Impurities such as inclusions deriving from refractory material are thus intercepted by the heel and effectively removed by slot 24, which acts as a drain. Provision may also be made for means of reheating as well as at least one transverse row of agitators 26. Any agitator of known type may be used; in particular, provision may be made for agitators suspended from the vault, in the form of stirrers consisting of a working part formed by vertical cylinders fitted to the end of arms issuing from vertical shafts. There may also be used, either alone or in combination with the foregoing, other agitators such as those of the blender type which, because of their design, impart to the glass a spiral rather than circular movement, which is therefore more effective since it acts on the depth of the flow of glass.

Agitators 26 are made to rotate by means of motors (not shown). They are located after bottom drain 24 so as not to disturb the drainage operation.

Lastly, this zone is equipped downstream of drain 24 and agitators 26 with a barrier 27 which plunges into the glass to an adjustable depth, this being done in order to regulate the loss of head due to the flow of the glass, particularly as a function of the drought to be obtained. Then, at the end of run of channel 1, the molten glass, thermally and chemically homogenous and drained at the bottom, on the surface and across its width, is poured at the desired rate by pouring lip 7, which is of reduced section.

In terms of size, all the zones are preferably more or less similar in length, with the exception of the first or forechannel zone 8 which may be slightly longer.

In terms of construction materials for this channel, the most suitable types of refractory materials are chosen according to the different zones of the channel and according to the temperature of the glass flowing therein. Thus, the fore-channel needs to be provided with the refractory materials most capable of withstanding corrosion and high temperatures, while other considerations may apply to the more downstream zones.

This channel may follow any melting compartment, whether of flame or electric melting type, either directly or through the intermediary of transition compartments. However, the melting compartment may advantageously discharge directly to the channel according to the invention, since such channel provides for both transfer and conditioning.

In conclusion, the channel according to the invention is very economic in operation since it allows for the absence of return flow without detracting from the quality of the glass, the inertia of the furnace being reduced accordingly.

Its design is comparatively simple and the conditioning which it performs can be easily regulated and adapted to the manufacture of any type of glass, in particular special glasses since it can be used where necessary to control very accurately the composition of the atmosphere above the level of the glass.

Conditioning is at least as good as with an assembly of neck/conditioning zone/channel type. It should also be noted that the channel according to the invention may be chosen in a length very similar to that of the above-mentioned assembly. This type furnaces may make it possible to upgrade the present conditioning type furnaces without having to remodel them entirely.

Obviously, numerous modifications and variations of the present invention are possible in light of the above teachings. It is therefore to be understood that the invention may be practiced otherwise than as specifically described herein.

What is claimed as new and desired to be secured by Letters Patent of the United States is:

1. A channel device for containing molten glass flowing between a melting and refining zone supplied with vitrifiable materials and a molten glass forming zone and for conditioning the molten glass from its melting temperature to its forming temperature, comprising:

a duct and a superstructure covering said duct to define a channel positionable between the melting and refining zone and the molten glass forming zone, the channel defining a multiplicity of zones which are arranged successively in relation to a direction of glass flow along a longitudinal axis of said channel, said zones successively comprising at least one transition zone, at least one drainage zone, at least one cooling zone, at least one thermal homogenization zone and at least one chemical homogenization zone;

means for thermally separating each of said zones; and means for individually controlling the temperature in each of said zones.

2. The channel device according to claim 1, wherein a depth of the channel is such that a belt of convective recirculation of molten glass in the direction of melting and refining zone is not formed.

3. The channel device according to claim 1 wherein said thermal separating means comprise one of suspended heat shields, shading walls, surbased arches and partly suspended dams submerged in the molten glass.

4. The channel device according to claim 1 wherein the channel has a bottom wall which is substantially located in a horizontal plane.

5. The channel device according to claim 1 including at least one element forming a modification of a sectional area of said channel.

6. The channel device according to claim 5 wherein said at least one element forming a modification of a sectional area of said channel includes an element at a junction between said at least one transition zone and an adjacent downstream zone.

7. The channel device according to claim 1 wherein a width and a cross sectional area of the at least one transition zone exceed that the zones downstream thereto.

8. The channel device according to claim 1 including means for draining molten glass from said at least one transition zone.

9. The channel device according to claim 8 wherein said means for draining comprise:

at least one outflow branch extending laterally from said channel to form a skimmer pocket; and a surface drain located at the end of each said at least one outflow branch.

10. The channel device according to claim 1 including burners located in said transition zone and arranged in symmetrical rows relative to the longitudinal axis of the channel.

11. The channel device according to claim 1 wherein said drainage zone has means for draining a central portion of the molten glass in said channel, comprising a submerged rotating entrainment device and a surface drain located for receiving material entrained by said entrainment device.

12. The channel device according to claim 11 including a barrier partly submerged in the molten glass in said drainage zone immediately downstream of said surface drain and inclined at an angle other than 90° relative to the longitudinal axis of said channel.

13. The channel device according to claim 1 including least three of said cooling zones for successive cooling of the molten glass.

14. The channel device according to claim 13 wherein at least one of said cooling zones includes means for circulating an external gas along the longitudinal axis of the channel.

15. The channel device according to claim 13 wherein at least one of said cooling zones includes means for circulating an external cooling fluid through walls of said superstructure.

16. The channel device according to claim 15 wherein said walls of said superstructure include a honeycomb structure through which said cooling fluid circulates.

17. The channel device according to claim 15 wherein said means for circulating an external cooling fluid through walls of said superstructure includes at least one outside fluid injection point and at least two fluid exhaust points.

18. The channel device according to claim 13 wherein at least one of said cooling zones includes means for reheating lateral portions of said molten glass in said channel.

19. The channel device according to claim 18 wherein said means for reheating comprise at least one of edge burners, flat-flow burners and radiant tubes.

20. The channel device according to claim 1 wherein said at least one thermal homogenization zone has heat insulation and is provided with heat conditioning means for eliminating any temperature gradient therein transverse to the longitudinal axis of said channel.

21. The channel device according to claim 20 wherein said heat conditioning means include cooling means.

22. The channel device according to claim 1 wherein said at least one chemical homogenization zone includes means for drainage of the molten glass in the channel.

23. The channel device according to claim 22 wherein said means for drainage in said chemical homogenization zone comprises a heel in the bottom of the channel and a slot in the bottom and situated immediately upstream of the heel.

24. The channel device according to claim 23 wherein said homogenization zone comprises a multiplicity of agitators arranged downstream of the slot.

25. The channel device according to claim 24 wherein said homogenization zone includes a barrier having an adjustable height and located downstream of the slot and agitators for regulating the loss of head in the channel due to the flow of glass therein.

26. The channel device according to claim 1 including a lip of reduced section at a downstream end thereof.

27. A furnace for melting vitrifiable materials comprising a zone for the melting and refining of vitrifiable materials and a channel device for containing molten glass flowing between the melting and refining zone supplied with vitrifiable materials and a molten glass forming zone and for conditioning the molten glass from its melting temperature to its forming temperature, said channel device comprising:

a duct and a superstructure covering said duct to define a channel positionable between the melting and refining zone and the molten glass forming zone, the channel defining a multiplicity of zones which are arranged successively in relation to a direction of glass flow along a longitudinal axis of said channel, said zones successively comprising at least one transition zone, at least one drainage zone, at least one cooling zone, at least one thermal homogenization zone and at least one chemical homogenization zone;

means for thermally separating each of said zones; and means for individually controlling the temperature in each of said zones.

28. The furnace according to claim 27 including a heat shield separating said melting and refining zone from said channel device.

29. The furnace according to claim 27 wherein a bottom of said channel is elevated relative to that of said melting and refining zone.

30. A process for conditioning molten glass by melting vitrifiable materials in a furnace comprising a zone for the melting and refining of vitrifiable materials and a channel device for containing molten glass flowing between the melting and refining zone supplied with vitrifiable materials and a molten glass forming zone and for conditioning the molten glass from its melting temperature to its forming temperature, said channel device comprising a duct and a superstructure covering said duct to define a channel positionable between the melting and refining zone and the molten glass forming zone, the channel defining a multiplicity of zones which are arranged successively in relation to a direction of glass flow along longitudinal axis of said channel, said zones successively comprising at least one transition zone, at least one drainage zone, at least one cooling zone, at least one thermal homogenization zone and at least one chemical homogenization zone, said process comprising the steps of:

thermally separating each of said zones; and individually controlling the temperature in each of said zones.

* * * * *